J. H. BLESSING.

Assignor, by mesne Assignments, to the ALBANY STEAM-TRAP CO.

Steam-Trap.

No. 8,286. Reissued June 18, 1878.

Witnesses:
Geo. H. Miatt
Geo. H. Grand

Inventor:
James H. Blessing
By his Attorney,
E. N. Dickerson Jr.

2 Sheets—Sheet 2.

J. H. BLESSING.

Assignor, by mesne Assignments, to the ALBANY STEAM-TRAP CO.

Steam-Trap.

No. 8,286. Reissued June 18, 1878.

Witnesses:

Geo. H. Miatt

Geo. H. Evans

Inventor:

James H. Blessing

By his Attorney

E N Dickerson Jr

UNITED STATES PATENT OFFICE

JAMES H. BLESSING, OF ALBANY, NEW YORK, ASSIGNOR, BY MESNE ASSIGNMENTS, TO THE ALBANY STEAM TRAP COMPANY.

IMPROVEMENT IN STEAM-TRAPS.

Specification forming part of Letters Patent No. 142,323, dated September 2, 1873; Reissue No. 8,286, dated June 18, 1878; application filed May 10, 1878.

*To all whom it may concern:*

Be it known that I, JAMES H. BLESSING, of Albany, in the county of Albany and State of New York, have invented a new and Improved Steam-Trap; and I do hereby declare that the following is a full, clear, and exact description thereof, reference being had to the accompanying drawings, making part of this specification, in which—

Figure 1:
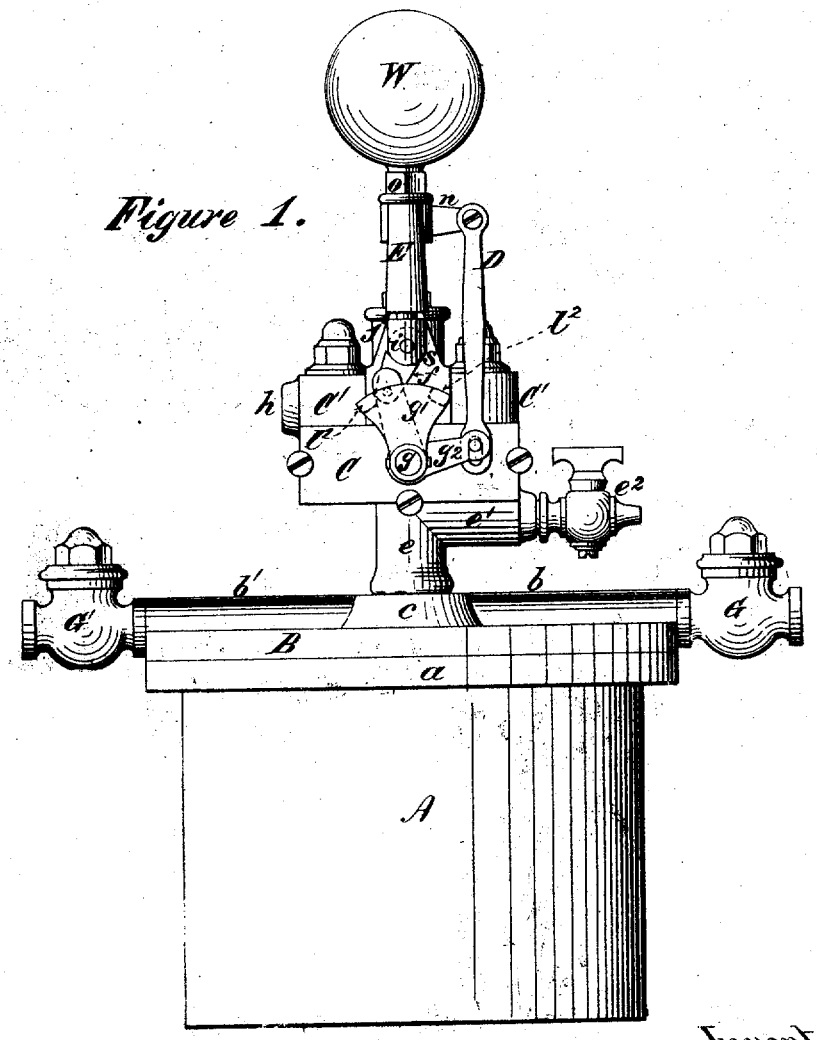
Figure 3:
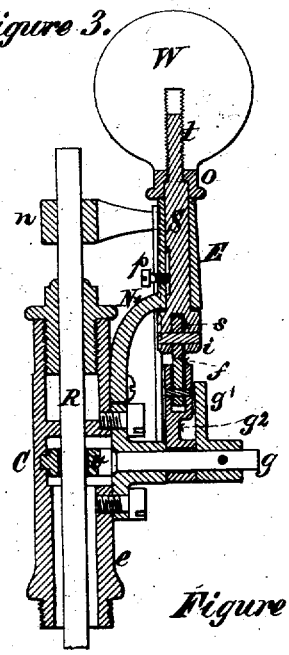
Figure 4:
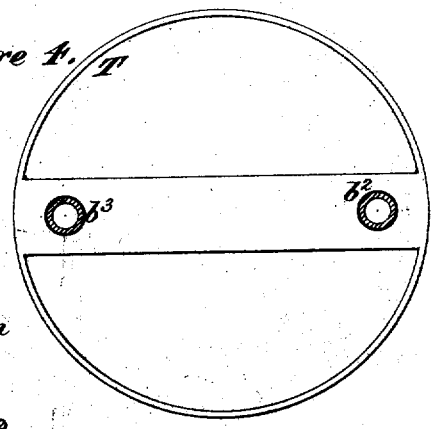
Figure 2:
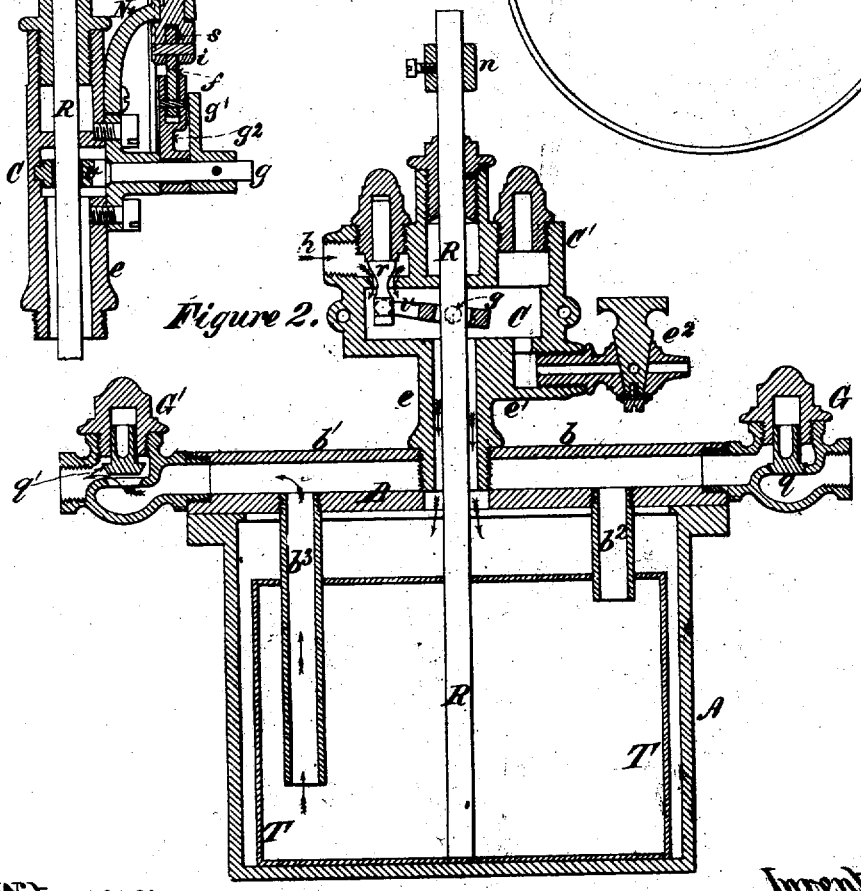

Figure 1, Plate 1, is a front elevation of the trap complete. Fig. 2, Plate 2, is a vertical section taken centrally through the trap, exposing to view the interior construction thereof. Fig. 3, Plate 2, is a vertical cross-section through the upper portion of the apparatus, the section being taken at right angles to that of Fig. 2. Fig. 4, Plate 2, is a top view of the vertically-movable bucket.

Similar letters of reference indicate corresponding parts in the four figures.

This invention relates to a new and improved trap which is designed for conducting back into the boiler the water which results from the condensation of steam in heaters for buildings. My object is to employ an automatical vertically-moving bucket, which is arranged in the receiver for the condensed water, in combination with a tripping device for actuating a steam-inlet valve, as will be hereinafter explained.

My invention consists, generally, in a rising and falling bucket connected with mechanism by means of which steam is admitted to and shut off from the receiving-vessel, the said mechanism being provided with a means for retarding the action of the apparatus, thereby allowing a sufficient interval for the supply and discharge of the water before the equalizing steam-valve is opened or shut into the rising and falling floating bucket. There are two deliveries—one delivering to the bucket the water of condensation, the other discharging from the bucket the water-supply of the first delivery. The second delivery consists of a siphon-pipe which dips into the bucket nearly to its bottom, allowing only sufficient motion to accomplish the results aimed at.

The following description of my invention will enable others skilled in the art to understand it.

In the accompanying drawings, Figs. 1 and 2, A represents a flanged cylinder, which has a head, B, bolted tightly on it, and which is arranged above the water-level of a steam-boiler, and made of sufficient capacity to receive the water of condensation from steam-heaters. Inside of this receiver A is an open-top bucket, T, which is less in its height and diameter than the space in which it works, which allows it to rise and fall a proper distance to actuate the tripping devices on top of the receiver. This bucket has secured centrally to it a vertical rod, R, which passes up through a tubular neck, *e*, through a tripping-lever box, and through a stuffing-box, *j*, and has an arm, *n*, rigidly but adjustably secured to it near its upper end, for a purpose hereinafter explained. The head B on the receiver is constructed with two tubular passages, $b$ $b^1$, which communicate with each other through the receiver only. The inlet-passage $b$ is provided with a valve-box, G, and an inlet-check valve, *q*, and also with a short pipe, $b^2$, dipping down into the bucket T. The outlet-passage $b^1$ is provided with a valve-box, G′, in which is an outlet-check valve, *q′*; and this passage communicates with the bucket T by means of a siphon-pipe, $b^3$, which is considerably longer than the pipe $b^2$. The course of the water of condensation from the heating-coils is through the pipes $b$ $b^2$ into the bucket T, and thence out of this bucket through pipes $b^3$ and $b^1$ into the steam-boiler. The tube *e* is tapped into the center of the head B, and with an outlet, $e^1$, for a cock, $e^2$, cast in the bottom of a valve-box, C C′. This tube *e* cuts off direct communication between the pipes $b$ $b^1$, but forms a free communication between the interior of the receiver A and the interior of the valve-box C C′, as shown in Figs. 2 and 3.

Steam from the boiler is admitted into the upper portion C′ of the valve-box through a passage, *h*, and when a valve, *r*, therein is lifted the steam passes through the lower portion C of said valve-box and through the tube *e* into the receiver A above the water therein, the effect of which will be to close valve $q$ and force water out of the bucket T, through pipes $b^3$ $b^1$ and the valve-box G′, into the boiler. By thus relieving the bucket of its weight of water it will be buoyed up by the surrounding water in the receiver A. At the same time the steam which was forced into the vessel A will condense and produce a partial vacuum therein, at which time the valve will shut and the vessel T will again be supplied with water from the heaters through pipes $b$ $b^2$ until there is a *plenum* in the vessel A.

In the chamber C of the valve-box is an oscillating arm, $v$, for lifting the valve $r$ at proper times, which arm is formed on a stem, $g$, extending out through the front plate of the valve-box, and carrying a segment, $g^1$, and a vibrating angular lever, $g^2$.

The oscillating arm $v$ is not in any way connected with the rod R, excepting through the tripping device shown in Fig. 3. The segment $g^1$ is the apparatus by means of which the bucket is allowed to fill and discharge up to a certain point before the steam-valve is opened or shut; otherwise it might result that the steam-valve would be started from its seat a little, so as to equalize the pressure in the coils and in the trap without admitting sufficient pressure to force the water back into the boiler through the siphon-pipe $b^3$. The segment $g^1$ is keyed to the stem $g$ and constructed with a lug, $l^2$, at each extremity, between which lugs one arm of the lever $g^2$ plays. This angular lever $g^2$ plays freely on the stem $g$, and the arm which plays between the lugs on segment $g^1$ has a tripping-piece, $f$, pivoted to it, on the concave end of which rests an anti-friction wheel, $s$. This wheel $s$ is pivoted on the lower end of a stem, S, which has vertical play in the tubular portion E of a bracket, N, but which is prevented from turning in the tube by a screw, $p$, (shown in Fig. 3.) On the upper end of the vertically-movable stem S is a screw-threaded portion, $t$, on which is applied a jam-nut, $o$, and a spherical weight, W. The axis of the loaded stem S intersects the axis of the oscillating valve-lifting stem $g$ in a vertical plane, and the segment $g^1$ is vibrated by the angular lever $g^2$ equidistant from such plane on each side of it. The arm of the angular lever $g^2$, which does not play between the lugs on segment $g^1$, has a wrist-pin fixed to its extremity, which passes through a vertically-oblong slot made through a link, D. This link is pivoted to the arm $u$ on the bucket-rod R, as shown in Fig. 1.

As before stated, this trap is located above the water-level of the steam-boiler. The pipe which leads from the steam-heaters of a building is attached to the valve-box G. The pipe which leads from the trap into the boiler for conducting the water of condensation into the boiler is connected to the valve-box G′; and the pipe which supplies steam to the trap from the boiler is connected to the inlet-passage $h$ at the upper part C′ of the valve-box.

To start this trap, it is necessary to fill the receiver A and the bucket T with water. The siphon-pipe $b^3$ and the descending pipe which delivers to the boiler should also be filled with water, which may be done by any of the well-known means. The bucket will then be down, as represented in Fig. 2. The cock $e^3$ should be shut and the valve $r$ (which I denominate the equalizing-valve) open. Steam from the boiler will enter at $h$ and force a portion of the water from the bucket T out of the trap into the boiler. This will cause the bucket to rise in its surrounding fluid until the link D engages with its wrist-pin on one arm of lever $g^2$.

The upward movement of the bucket and its rod B will then temporarily cease until the pressure of steam displaces a sufficient weight of water from the bucket to overcome the weight W on the upper end of the stem S, when the bucket will further rise quickly and cause a closure of the steam-valve $r$. In a few seconds all the steam which was admitted into the trap will condense, and the pressure in the trap will be reduced below that in the heating-coils, which will allow the drip-water to be forced through the influx-pipes $b$ $b^2$ into the bucket T. When a sufficient quantity of water has thus flowed into the bucket it will, by its descent, cause the angular lever $g^2$ to act on segment $g^1$ and lift the valve $r$ again, thus admitting steam from the boiler into the trap. The operation will then be continued, as above described.

I claim—

1. A steam-trap provided with a rising and falling bucket contained within a shell, into which the return-water is delivered, and from which it is discharged by a siphon-pipe which passes nearly to the bottom of said bucket, substantially as described.

2. A steam-trap provided with a rising and falling bucket contained within a shell, into which the water is delivered, and from which it is discharged by a siphon-pipe passing nearly to the bottom of the apparatus, the said bucket being attached to apparatus operating the steam-valve, which apparatus does not open or close the steam-valve at the commencement of the fall or rise of the bucket, but allows an interval of time to elapse between the movement of the bucket and its action on the steam-valve, whereby the bucket is entirely filled and discharged, substantially as described.

3. An improved steam-trap provided with a rising and falling bucket, through the top of which the water is delivered and discharged by means of a delivery and discharge pipe, each provided with a check-valve, substantially as described.

4. An improved steam-trap provided with a rising and falling floating bucket, into which the water is delivered, and through which it is discharged by means of a siphon-pipe reaching nearly to its bottom, and provided with an air-cock, by means of which the accumulated air may be discharged from the apparatus, substantially as described.

5. The inlet and outlet passages $b$ $b^1$, provided with check-valves, and combined with a water-receiver containing a vertically-movable bucket, T, into which the water enters and from which it is discharged, substantially as and for the purposes described.

JAMES H. BLESSING.

Witnesses:

S. F. SULLIVAN,

T. H. HARRAH.